United States Patent
Chung et al.

(10) Patent No.: US 11,511,271 B2
(45) Date of Patent: Nov. 29, 2022

(54) METAL OXIDES-SILICA COMPOSITE AND METHOD FOR PREPARING THE SAME

(71) Applicant: Academia Sinica, Taipei (TW)

(72) Inventors: Po-Wen Chung, Taipei (TW); Meng-Xun Wu, Taipei (TW)

(73) Assignee: ACADEMIA SINICA, Taipei (TW)

( * ) Notice: Subject to any disclaimer, the term of this patent is extended or adjusted under 35 U.S.C. 154(b) by 637 days.

(21) Appl. No.: 16/454,893

(22) Filed: Jun. 27, 2019

(65) Prior Publication Data

US 2020/0346201 A1 Nov. 5, 2020

(30) Foreign Application Priority Data

May 3, 2019 (TW) .................. 108115362

(51) Int. Cl.
| | | |
|---|---|---|
| *B01J 37/03* | (2006.01) | |
| *B01J 23/02* | (2006.01) | |
| *B01J 21/08* | (2006.01) | |
| *B01J 35/10* | (2006.01) | |
| *B01J 37/02* | (2006.01) | |
| *B01J 37/10* | (2006.01) | |

(52) U.S. Cl.
CPC ............ *B01J 37/035* (2013.01); *B01J 21/08* (2013.01); *B01J 23/02* (2013.01); *B01J 35/1014* (2013.01); *B01J 35/1019* (2013.01); *B01J 35/1061* (2013.01); *B01J 37/0236* (2013.01); *B01J 37/10* (2013.01)

(58) Field of Classification Search
CPC .. B01J 35/002; B01J 35/1014; B01J 35/1019; B01J 35/1061; B01J 37/0236; B01J 37/031; B01J 37/035; B01J 37/10; B01J 37/03; B01J 37/08; B01J 23/02; B01J 21/08; B01J 21/14; C01B 33/20; C01B 33/26

See application file for complete search history.

(56) References Cited

U.S. PATENT DOCUMENTS 10,941,043 B2 * 3/2021 Kim .................... C01B 33/1585

OTHER PUBLICATIONS

CN 104941538, year:2015, Jin C, machine translation in english.*
CN 104941538, year:2015, Jin C, abstract translation in english.*
Meng-Xun Wu et al., "Exploring the acid-base properties of the surface of Mg—Al—Si composite oxide and its influence on ethanol conversion," The 36th Taiwan Symposium on Catalysis and Reaction Engineering, Jun. 28, 2018, pp. 1-4.

\* cited by examiner

*Primary Examiner* — Smita S Patel
(74) *Attorney, Agent, or Firm* — Muncy, Geissler, Olds & Lowe, P.C.

(57) ABSTRACT

Metal oxides-silica composite materials are synthesized by a co-precipitation method to serve as modified catalysts for converting ethanol into four-carbon hydrocarbons. The method includes mixing a liquid-phase silicon source and a metal precursor at different ratios so as to change the acid-base composition of the composite materials and thereby increase selectivity with respect to the four-carbon products.

9 Claims, 12 Drawing Sheets

METAL OXIDES-SILICA COMPOSITE AND METHOD FOR PREPARING THE SAME

CROSS REFERENCE TO RELATED APPLICATION

This application claims the benefits of the Taiwan Patent Application Serial Number 108115362, filed on May 3, 2019, the subject matter of which is incorporated herein by reference.

BACKGROUND OF THE INVENTION

1. Technical Field

The present invention relates to a metal oxides-silica composite material and a method for preparing the same. More particularly, the invention relates to a metal oxides-silica composite for use as a catalyst and a method for preparing the same.

2. Description of Related Art

As a four-carbon product, 1,3-butadiene is an important material in the organic chemical industry and can be used to produce intermediate monomers of various polymers such as polybutadiene rubber, acrylonitrile-butadiene-styrene (ABS) resin, and styrene-butadiene copolymers (SBC). Conventionally, four-carbon products are byproducts of a naphtha cracking process for producing ethylene. With the mining of shale gas, however, the yield of ethylene by cracking naphtha has gradually decreased, and the supply of 1,3-butadiene is reduced as a result. To satisfy the market demand for 1,3-butadiene, more and more attention has been paid to converting ethanol into four-carbon products and hence to the catalyst design in the ethanol conversion reaction.

The mechanism of convening ethanol into four-carbon products includes: (a) dehydrogenation of ethanol to produce acetaldehyde, (b) aldol condensation followed by dehydration to produce crotonaldehyde, (c) reduction of crotonaldehyde to produce crotyl alcohol, and (d) intramolecular dehydration of crotyl alcohol to yield 1,3-butadiene. Alternatively, the crotonaldehyde produced is hydrogenated to yield 1-butanol.

As dehydrogenation and dehydration must take place at the catalyst surface during the ethanol conversion process, research efforts have been made in the industry to develop catalysts with the desired surface properties, particularly acidic or basic properties. Take hydrotalcite-derived oxides for example. Magnesium oxide, which is basic, promotes dehydrogenation whereas aluminum oxide, which is acidic, encourages dehydration. It is currently known that hydrotalcite-derived oxides can be prepared by reacting hydrotalcite with methyl silicate or ethyl silicate, or more specifically by mixing hydrotalcite blocks physically with the silicon source and then calcinating the mixture. Such hydrotalcite-derived oxides, however, show unsatisfactory catalytic reactivity due to the limited quantity of effective acidic/basic interfaces formed by mixing the hydrotalcite blocks with the silicon source.

BRIEF SUMMARY OF THE INVENTION

One objective of the present invention is to provide a metal oxides-silica composite whose preparation method is different from the conventional ones, and which is suitable for use as a catalyst for dehydrogenation and dehydration. The method by which the metal oxides-silica composite is synthesized makes a difference to the surface area, pore size distribution, acidic/basic point distribution, and hence catalytic reactivity of the composite, resulting in superior catalytic properties that are different from those of the conventional materials.

To achieve the above and other objectives, the present invention provides a method for preparing a metal oxides-silica composite as follows. To begin with, a silicon-containing basic solution is provided. This solution contains a liquid-phase silicon source and a basic agent, both dissolved in a first solvent. A metal precursor solution is then used to titrate the silicon-containing basic solution so that a titration reaction takes place between the metal precursor solution and the silicon-containing basic solution at a pH value greater than 7. The metal precursor solution contains an $M^{3+}$ salt and an $N^{2+}$ salt, both dissolved in a second solvent, wherein the $M^{3+}$ salt and the $N^{2+}$ salt are a trivalent metal salt and a bivalent metal salt respectively. The titration reaction between the metal precursor solution and the silicon-containing basic solution takes place at an N:M:Si molar ratio of 3:1:x, where $0<x\le10$. Once the titration reaction is completed, an aging reaction follows so that a precipitate is obtained. The precipitate is then calcinated to produce the metal oxides-silica composite.

The present invention further provides another method for preparing a metal oxides-silica composite, wherein the method includes: titrating a basic solution with a metal precursor solution so that a titration reaction takes place between the metal precursor solution and the basic solution at a pH value greater than 7, wherein the basic solution contains the basic agent dissolved in the first solvent, the metal precursor solution contains an $M^{3+}$ salt and an $N^{2+}$ salt, both dissolved in a second solvent, the $M^{3+}$ salt and the $N^{2+}$ salt are a trivalent metal salt and a bivalent metal salt respectively, and the N:M molar ratio is 3:1; adding the liquid-phase silicon source after completion of the titration reaction, and allowing a precipitate to form through an aging reaction, wherein the liquid-phase silicon source is added at an N:M:Si molar ratio of 3:1:x, in which $0<x\le10$; and calcinating the precipitate to produce the metal oxides-silica composite.

In contrast to the prior art in which hydrotalcite blocks are used to react with a silicon source, the present invention uses a metal precursor to react with the silicon source instead. Now that chemical bonds form more easily between a metal precursor and a silicon source than between hydrotalcite blocks and a silicon source, the invention features a significant increase in the effective reaction interfaces. In other words, a material prepared according to the invention will have a larger quantity of effective and better distributed acidic/basic interfaces and therefore better catalytic properties than its prior art counterparts.

In the present invention, the liquid-phase silicon source may be any liquid-phase material that can provide the element silicon. For example, the liquid-phase silicon source may be, but is not necessarily, selected from the group consisting of alkoxysilane, silicate, and a combination of the above. The liquid-phase silicon source in the invention allows silica to mix more thoroughly in the resulting metal oxides-silica composite than is achievable with a solid-phase silicon source.

In the present invention, the basic agent may be any basic substance that can provide a basic reaction condition to ensure that the titration reaction continues at a pH value greater than 7 (e.g., greater than or equal to 10). The invention has no special limitation on the basic agent. For example, the basic agent may be an alkali metal salt such as an alkali metal hydroxide. In one embodiment of the invention, and by way of example only, a sodium-containing base is used as the basic agent.

In the present invention, the $M^{3+}$ salt may be an aluminum salt, and the $N^{2+}$ salt may be a magnesium salt. For example, aluminum nitrate and magnesium nitrate are used in one embodiment of the invention, and the salts (e.g., sodium nitrate) formed with the nitrate ions after reaction are embedded in the synthesized material and then degraded during the calcination process to form pores. In another embodiment of the invention, aluminum sulfate and magnesium sulfate are used instead, and the salts (e.g., sodium sulfate) formed with the sulfate ions after reaction can be washed away after calcination.

In the present invention, the first solvent and the second solvent can be chosen according to the desired crystalline phase(s) of the end product. For example, both solvents may be, but are not limited to, water or aqueous alcohol solutions. It should be pointed out that the invention not only allows the crystalline phase(s) of the synthesized material to be changed by controlling the timing of adding the liquid-phase silicon source, but also can control the precipitation speeds of different crystalline phases with the choice of the solvents. In one embodiment of the invention, for example, an aqueous methanol solution (methanol:water=1:1 by volume) is used as the second as well as the first solvent so that, when the liquid-phase silicon source is added to react with the metal precursor, the methanol can retard the precipitation of hydrotalcite (which may otherwise compete with the silicate in order to be precipitated), allowing the synthesized material to be composed entirely of the crystalline phase of aluminum magnesium silicate. In another embodiment of the invention, deionized water is used as the second as well as the first solvent to produce a metal oxides-silica composite composed of two crystalline phases.

In the present invention, the aging reaction may take place at a temperature of at least 65° C., and the calcination may be performed at a temperature of at least 100° C. More specifically, the calcination may include an at least two-stage procedure: a first calcination process is performed at a temperature of at least 110° C. for a first predetermined amount of time, and then the temperature is raised to at least 550° C., at which a second calcination process is performed for a second predetermined amount of time. The first predetermined amount of time may be at least 6 hours, and the second predetermined amount of time may be at least 12 hours.

In the present invention, the precipitate may be dried (e.g., oven-dried or freeze-dried) before being calcinated; the invention has no limitation on the drying method. The choice of the drying method, however, will affect the porosity of the synthesized material. More specifically, oven drying facilitates the formation of medium-sized pores, whereas freeze-drying tends to form only micropores and no medium-sized pores in the resulting material.

A metal oxides-silica composite prepared according to the present invention may be composed entirely of the crystalline phase of a talc-derived oxide (e.g., aluminum magnesium silicate), or entirely of the crystalline phase of a hydrotalcite-derived oxide (e.g., an oxide derived from a mixture of hydrotalcite and silicon), or of a combination of the foregoing two crystalline phases. For example, one embodiment of the invention produces a metal oxides-silica composite identified as the crystalline phase of aluminum magnesium silicate, with medium-sized pores whose BJH pore sizes (i.e., pore sizes determined by the method proposed by Elliott P, Barrett, Leslie G. Joyner, and Paul P. Halenda) range from 2 nm to 10 nm. Another embodiment of the invention produces a hydrotalcite-derived oxide whose BJH pore sizes range from 7 nm to 15 nm and whose t-Plot micropore surface area is larger than or equal to about 15 m$^2$/g (between about 17 m$^2$/g and 35 m$^2$/g).

A metal oxides-silica composite prepared according to the present invention may have a BET surface area (i.e., specific surface area determined by the method proposed by Stephen Brunauer, Paul Hugh Emmett, and Edward Teller) larger than or equal to 200 m$^2$/g (between about 200 m$^2$/g and 450 m$^2$/g), a total basic group content between about 0.3 mmol/g and 0.7 mmol/g, and a total acidic group content between about 0.1 mmol/g and 1.0 mmol/g. Moreover, the ammonia temperature-programmed desorption profile of a metal oxides-silica composite prepared according to the invention may have a single desorption peak between 100° C. and 400° C., with the maximum desorption temperature ($T_p$) falling between 120° C. and 250° C., and the carbon dioxide temperature-programmed desorption profile of the same metal oxides-silica composite may have two desorption peaks between 100° C. and 400° C., with one maximum desorption temperature ($T_p$) falling between 100° C. and 150° C. and the other between 160° C. and 320° C.

It has been demonstrated that metal oxides-silica composites prepared according to the present invention provide outstanding selectivity in the dehydrogenation reaction of alcohols. Accordingly, the invention further discloses a use of such metal oxides-silica composites as catalysts for the dehydrogenation reaction of alcohols.

DETAILED DESCRIPTION OF THE INVENTION

Figure 1:
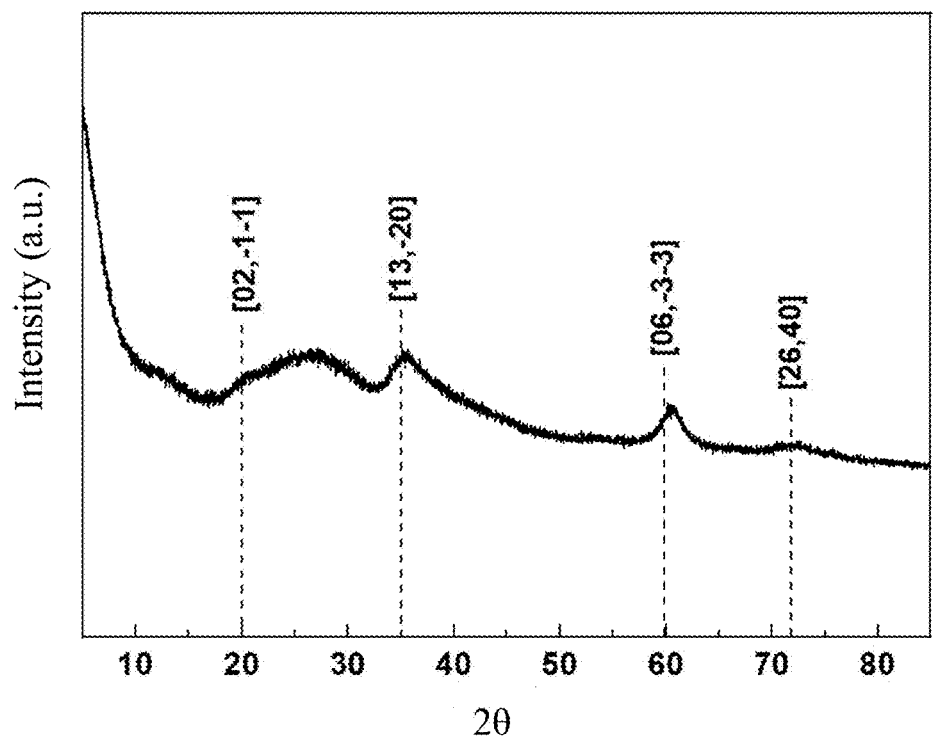
FIG. 1 and FIG. 2 are powder X-ray diffractograms of catalyst P-1 of the present invention, corresponding respectively to a state before calcination and a state after calcination.

The present invention uses mainly the following two precipitation methods to prepare metal oxides-silica composites:

[Precipitation Method I]

A silicon-containing basic solution is provided. The silicon-containing basic solution contains a liquid-phase silicon source and a basic agent, both dissolved in a first solvent. The silicon-containing basic solution is titrated with a metal precursor solution so that a titration reaction takes place between the metal precursor solution and the silicon-containing basic solution at a pH value greater than 7. The metal precursor solution contains an $M^{3+}$ salt and an $N^{2+}$ salt, both dissolved in a second solvent. The $M^{3+}$ salt and the $N^{2+}$ salt are a trivalent metal salt and a bivalent metal salt respectively. The titration reaction between the metal precursor solution and the silicon-containing basic solution takes place at an N:M:Si molar ratio of 3:1:x, where 0<x≤10. Once the titration reaction is completed, an aging reaction takes place to form a precipitate, and the precipitate is calcinated to produce a metal oxides-silica composite.

[Precipitation Method II]

A basic solution is titrated with a metal precursor solution so that a titration reaction takes place between the metal precursor solution and the basic solution at a pH value greater than 7. The basic solution contains a basic agent dissolved in a first solvent. The metal precursor solution contains an $M^{3+}$ salt and an $N^{2+}$ salt, both dissolved in a second solvent. The $M^{3+}$ salt and the $N^{2+}$ salt are a trivalent metal salt and a bivalent metal salt respectively, wherein the N:M molar ratio is 3:1. Once the titration reaction is completed, a liquid-phase silicon source is added at an N:M:Si molar ratio of 3:1:x, where 0<x≤10. After that, an aging reaction begins, and a precipitate is formed as a result. The precipitate is then calcinated to produce a metal oxides-silica composite.

The steps of precipitation methods I and II will be detailed below with reference to preparation examples 1~7 and preparation example 8 respectively. To start with, the solutions used in the preparation examples were prepared as follows:

[Metal precursor solution A-1]

$Mg(NO_3)_2 \cdot 6H_2O$ and $Al(NO_3)_3 \cdot 9H_2O$ (the molar ratio of Mg to Al being 3:1) were added into a 100 ml mixture of deionized water and methanol (the volume ratio of deionized water to methanol being 1:1).

[Metal Precursor Solution A-2]

$Mg(NO_3)_2 \cdot 6H_2O$ and $Al(NO_3)_3 \cdot 9H_2O$ (the molar ratio of Mg to Al being 3:1) were added into 100 ml deionized water.

[Metal Precursor Solution A-3]

$MgSO_4$ and $Al(SO_4)_3 \cdot 18H_2O$ (the molar ratio of Mg to Al being 3:1) were added into 100 ml deionized water.

[Metal Precursor Solution A-4]

$Mg(NO_3)_2 \cdot 6H_2O$ and $Al(NO_3)_3 \cdot 9H_2O$ (the molar ratio of Mg to Al being 3:1) were added into 100 ml deionized water.

[Basic Solution B-1]

$Na_2CO_3$ and NaOH of predetermined amounts were added into a 100 ml aqueous methanol solution.

[Silicon-Containing Basic Solution B-2]

$Na_2SiO_3$ and NaOH of predetermined amounts were added into 100 ml deionized water.

[Basic Solution B-3]

$Na_2CO_3$ and NaOH of predetermined amounts were added into 100 ml deionized water.

Preparation Example 1

Figure 2:
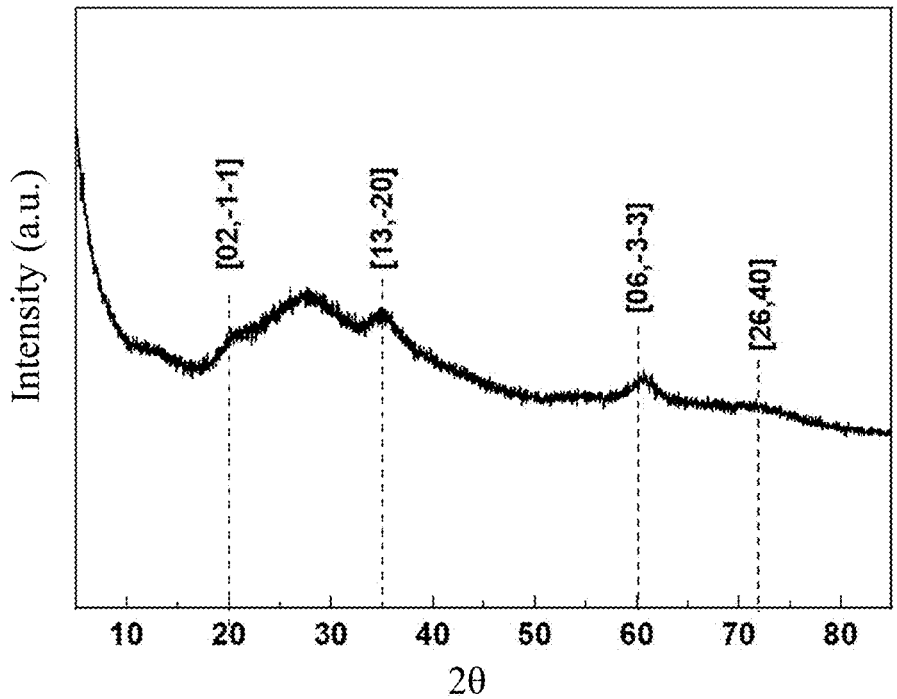

As the silicon source, tetraethoxysilane (TEOS) of a predetermined amount (the Mg:Al:Si molar ratio being 3:1:3) was added into an aqueous methanol solution and stirred for 10 minutes. After that, basic solution B-1 was added until pH=10 to produce a silicon-containing basic solution. Metal precursor solution A-1 was then added into the silicon-containing basic solution through a burette at a rate of about 1 drop per second, and during the process, the pH value was kept at 10 by using basic solution B-1. With the addition of metal precursor solution A-1, a white precipitate was gradually formed. Once the addition of metal precursor solution A-1 was completed, the resulting solution was stirred continuously for 10 minutes, with the pH value maintained at 10. Then, the solution was transferred into a high-density polyethylene (HDPE) bottle and allowed to age at 65° C. for 24 hours. After that, the precipitate was obtained by filtering the aged solution and was washed with deionized water until the filtrate became neutral. The washed precipitate was oven-dried at 90° C. and then analyzed with a powder X-ray diffractometer (PXRD). The analysis result identified the precipitate as the crystalline phase of aluminum magnesium silicate (see FIG. 1). In addition, a sample of the dried precipitate was subjected to a calcination procedure in which the temperature was raised to 110° C. over 1 hour, then kept at 110° C. for 6 hours, then raised again to 550° C. over 4 hours, and then kept at 550° C. for 12 hours to produce catalyst P-1. A PXRD analysis of the catalyst showed that the crystalline phase was unchanged after calcination (see FIG. 2).

Preparation Example 2

This preparation example was identical to preparation example 1 except that the $Na_2CO_3$ in basic solution B-1 was removed during the synthesis process. The calcinated product of this preparation example was catalyst P-2, which was identified as the crystalline phase of aluminum magnesium silicate.

Preparation Example 3

This preparation example was identical to preparation example 1 except that $Na_2NO_3$ was used to replace the $Na_2CO_3$ in basic solution B-1 during the synthesis process. The calcinated product of this preparation example was catalyst P-3, which was identified as the crystalline phase of aluminum magnesium silicate.

Preparation Example 4

This preparation example was identical to preparation example 1 except that metal precursor solution A-2 was used in place of metal precursor solution A-1 used in preparation example 1, and that silicon-containing basic solution B-2 was used in order to replace the TEOS in preparation example 1 with $Na_2SiO_3$ as the silicon source. The calcinated product of this preparation example was catalyst P-4, which was identified as the crystalline phase of aluminum magnesium silicate.

Preparation Example 5

This preparation example was identical to preparation example 4 except that freeze-drying was used instead of the 90° C. oven-drying step in preparation example 4. The calcinated product of this preparation example was catalyst P-5, which was identified as the crystalline phase of aluminum magnesium silicate.

Preparation Example 6

This preparation example was identical to preparation example 4 except that metal precursor solution A-3 was used in place of metal precursor solution A-2 used in preparation example 4. The calcinated product of this preparation example was catalyst P-6, which was identified as the crystalline phase of aluminum magnesium silicate.

Preparation Example 7

Figure 3:
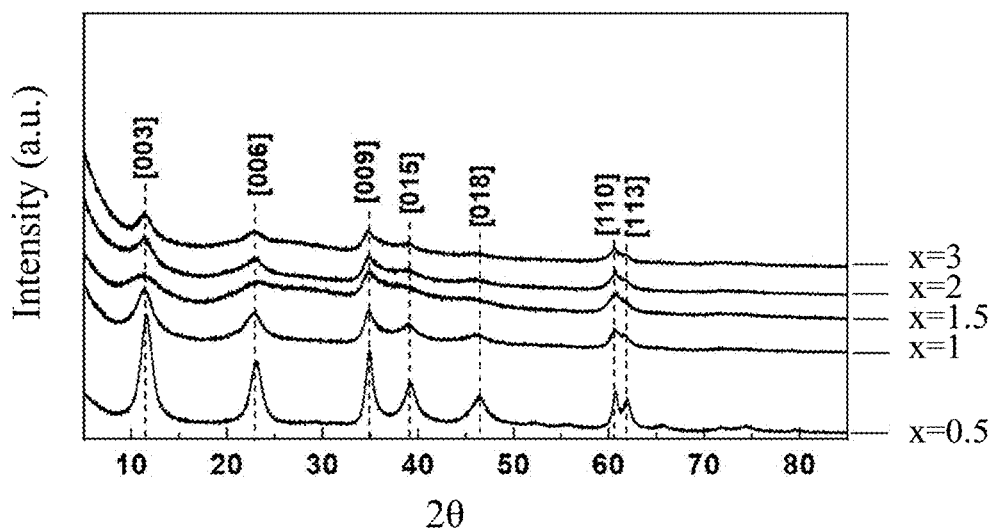
FIG. 3 and FIG. 4 are powder X-ray diffractograms of catalysts P-7 of the invention, corresponding respectively to a state before calcination and a state after calcination.
Figure 4:
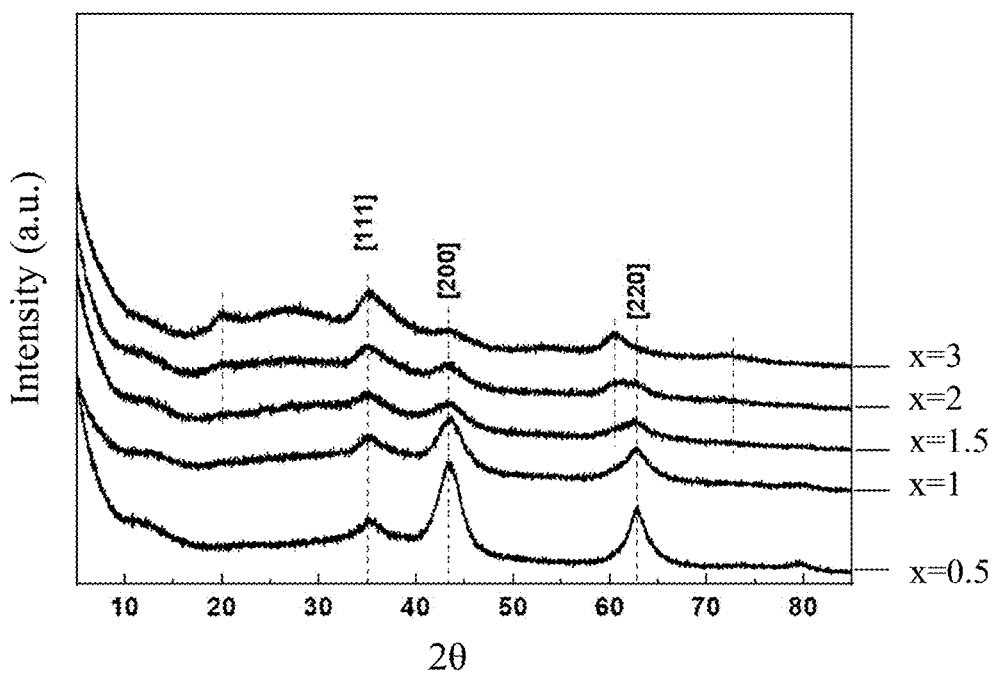

In this preparation example, five metal oxides-silica composites of different silicon contents were synthesized (the Mg:Al:Si molar ratio being 3:1:x, where x=0.5, 1, 1.5, 2, or 3). More specifically, TEOS of a predetermined amount was added into 100 ml deionized water and stirred for 10 minutes, and the remaining steps were the same as those in preparation example 1 except that metal precursor solution A-4 and basic solution B-3 were used in this preparation example instead of metal precursor solution A-1 and basic solution B-1 used in preparation example 1. The resulting precipitates were oven-dried and then subjected to a PXRD analysis, which identified the dried precipitates as the crystalline phase of hydrotalcite (see FIG. 3, in which the first line from the top is the PXRD analysis result corresponding to x=3, the second line corresponding to x=2, and so on). The calcinated products of this preparation example were catalysts P-7, and the PXRD analysis result of each catalyst P-7 showed that the (003)-plane basal spacing in the layered structure had disappeared (see FIG. 4, in which the first line from the top is the PXRD analysis result corresponding to x=3, the second line corresponding to x=2, and so on), meaning that the layered structure had been destroyed and formed a mixed metal oxide. Moreover, with the increase of the TEOS content, noticeable characteristic peaks of a second phase (of aluminum magnesium silicate hydrate) appeared at 2θ=20°, 35°, 61° and 72°. The second phase was more and more apparent as the TEOS content increased.

Preparation Example 8

Figure 5:
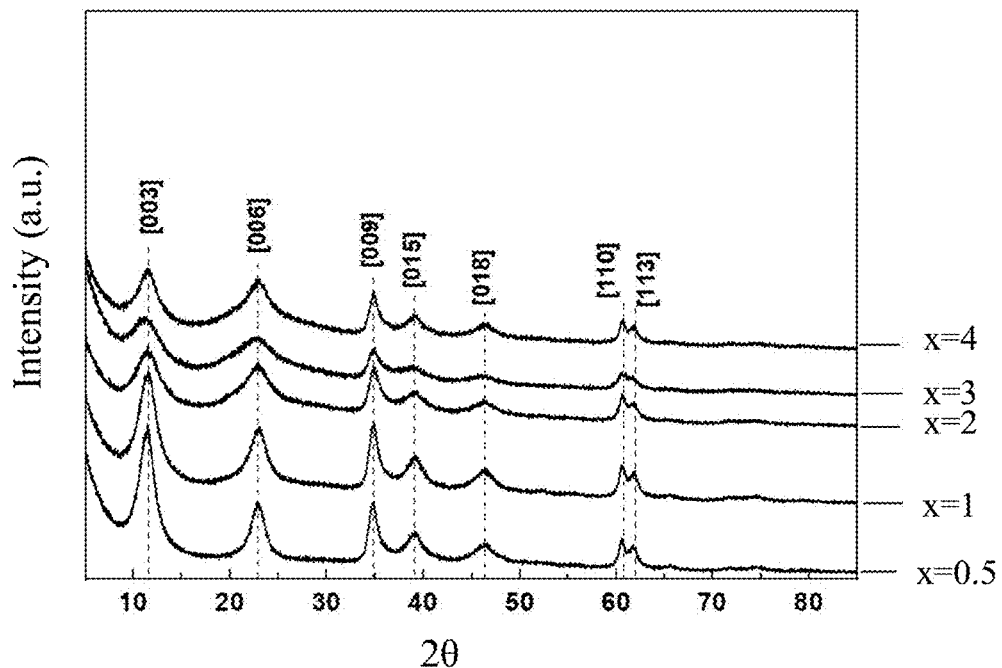
FIG. 5 and FIG. 6 are powder X-ray diffractograms of catalysts P-8 of the invention, corresponding respectively to a state before calcination and a state after calcination.
Figure 6:
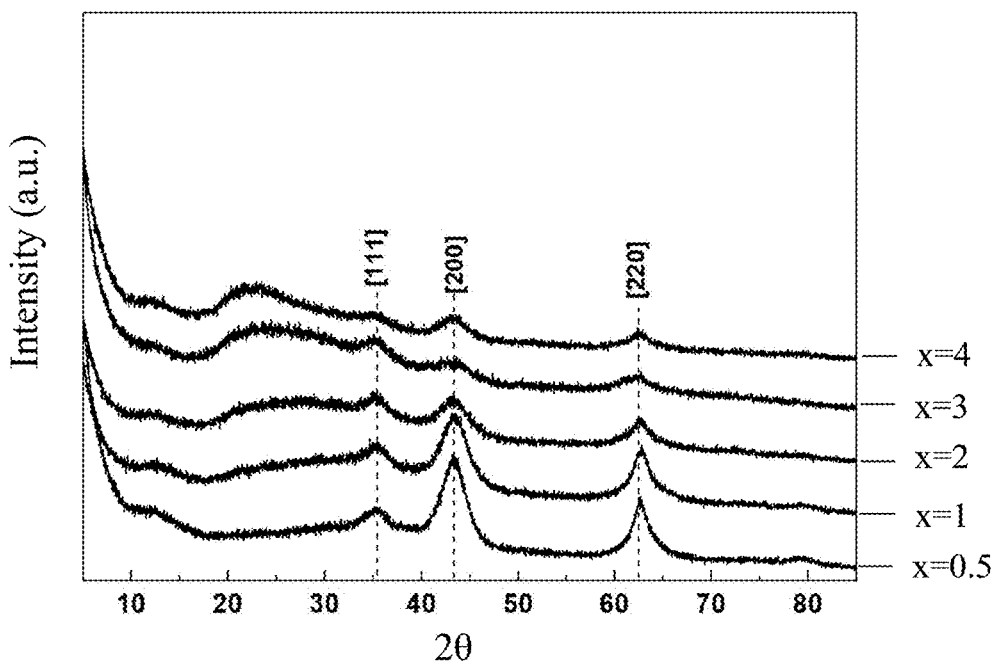

This preparation example was identical to preparation example 1 except that titration with metal precursor solution A-1 was completed before the predetermined amount of TEOS was added to the solution and stirred for 10 minutes (the Mg:Al:Si molar ratio being 3:1:x, where x=0.5, 1, 2, 3, or 4). The resulting precipitates were oven-dried and then subjected to a PXRD analysis, which identified the dried precipitates as composed of a single crystalline phase, or more specifically the crystalline phase of hydrotalcite (see FIG. 5, in which the first line from the top is the PXRD analysis result corresponding to x=4, the second line corresponding to x=3, and so on). The calcinated products of this preparation example were catalysts P-8 and were each identified by PXRD as composed of a single crystalline phase, or more specifically the crystalline phase of a hydrotalcite-derived oxide (see FIG. 6, in which the first line from the top is the PXRD analysis result corresponding to x=4, the second line corresponding to x=3, and so on).

ICP-OES (Inductively Coupled Plasma Optical Emission Spectrometry) Element/Composition Analysis The compositions of catalysts P-1~P-8 prepared in preparation examples 1~8 are tabulated in Table 1, in which the molar ratio of each element is normalized against the molar ratio of aluminum (as 1).

TABLE 1

| Catalyst | Mg wt % | Al wt % | Si wt % | Mg mole | Al mole | Si mole |
|---|---|---|---|---|---|---|
| P-1 | 14.4 | 6.87 | 18.4 | 2.326 | 1.000 | 2.572 |
| P-2 | 14.3 | 5.83 | 15.3 | 2.722 | 1.000 | 2.521 |
| P-3 | 16.6 | 6.79 | 17.4 | 2.713 | 1.000 | 2.461 |
| P-4 | 22.0 | 8.70 | 13.1 | 2.806 | 1.000 | 1.446 |
| P-5 | 17.9 | 7.17 | 11.4 | 2.771 | 1.000 | 1.527 |
| P-6 | 18.3 | 7.88 | 11.1 | 2.577 | 1.000 | 1.353 |
| P-7 (x = 0.5) | 28.1 | 11.2 | 3.47 | 2.784 | 1.000 | 0.298 |
| P-7 (x = 1) | 24.7 | 9.43 | 7.78 | 2.907 | 1.000 | 0.792 |
| P-7 (x = 1.5) | 21.1 | 8.42 | 9.36 | 2.781 | 1.000 | 1.068 |
| P-7 (x = 2) | 21.2 | 8.08 | 10.9 | 2.912 | 1.000 | 1.296 |
| P-7 (x = 3) | 18.1 | 6.92 | 15.1 | 2.903 | 1.000 | 2.096 |
| P-8 (x = 0.5) | 30.1 | 11.7 | 4.64 | 2.855 | 1.000 | 0.381 |
| P-8 (x = 1) | 22.0 | 8.62 | 8.26 | 2.833 | 1.000 | 0.920 |
| P-8 (x = 2) | 20.2 | 7.97 | 15.3 | 2.813 | 1.000 | 1.844 |
| P-8 (x = 3) | 16.9 | 6.75 | 19.5 | 2.779 | 1.000 | 2.775 |
| P-8 (x = 4) | 16.9 | 6.67 | 18.9 | 2.812 | 1.000 | 2.722 |

Physical Adsorption and Desorption of Nitrogen

Physical adsorption and desorption of nitrogen were measured (by volume) at −196° C. (the boiling point of liquid nitrogen), with a relative pressure $P/P_0$ ranging from 0.01 to 0.995, where $P_0$ was 750 mmHg.

Figure 7:
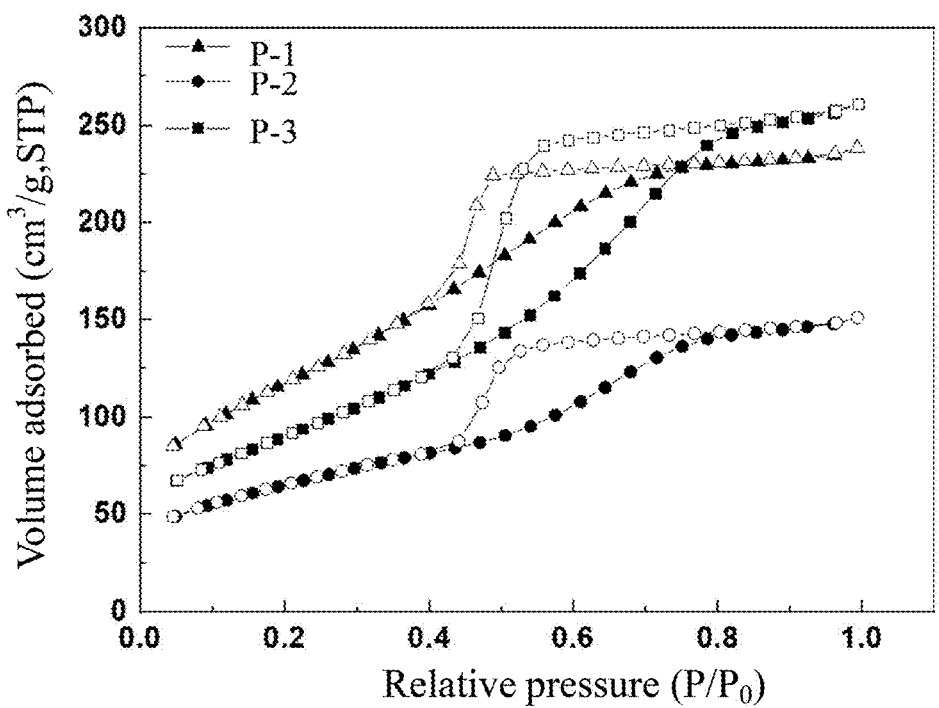
FIG. 7 shows nitrogen adsorption/desorption isotherms of catalysts P-1, P-2, and P-3 of the invention.
Figure 8:
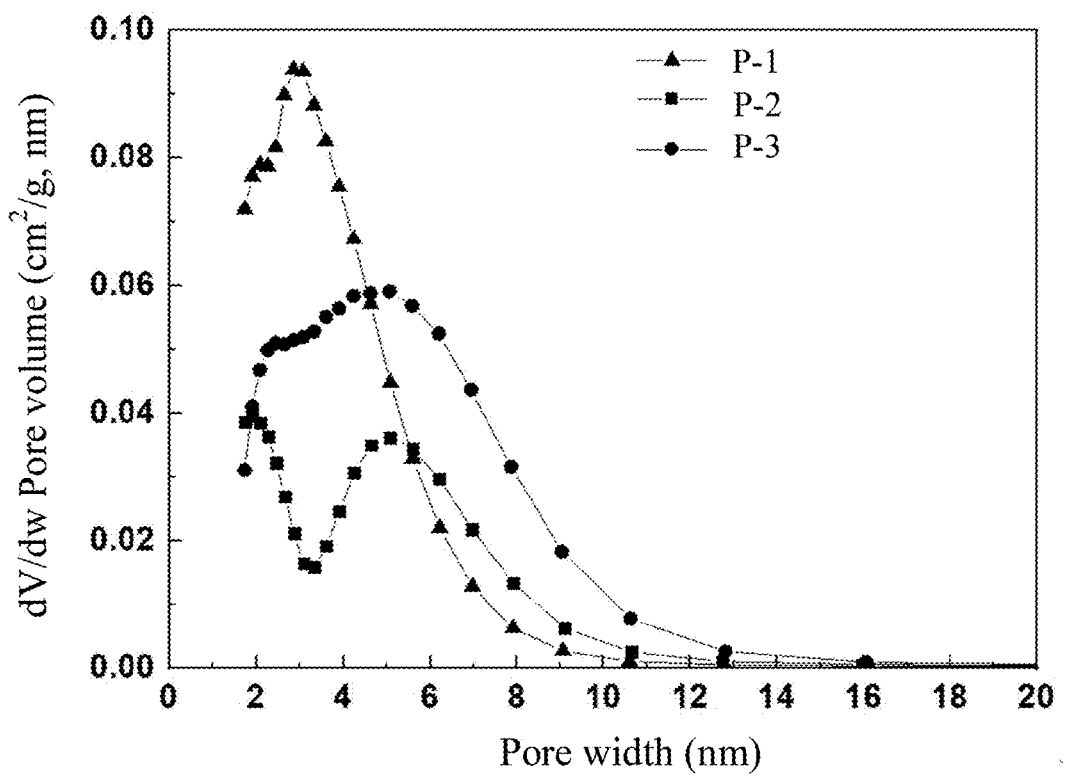
FIG. 8 shows pore size distribution curves of catalysts P-1, P-2, and P-3 of the invention.

Referring to FIG. 7 for nitrogen adsorption and desorption isotherms of catalysts P-1, P-2, and P-3, the adsorption isotherms are of type IV, and the desorption hysteresis curves are of type H2. This indicates that catalysts P-1, P-2, and P-3 have medium-sized pores, whose pore size distributions am shown in FIG. 8. The BJH pore sizes are 3 nm (P-1); 2 nm and 6 nm (P-2); and 2 nm and 6 nm (P-3). The BET surface areas are 427 $m^2/g$ (P-1), 231 $m^2/g$ (P-2), and 334 $m^2/g$ (P-3).

It can be known from the above that the preparation methods of the present invention can form noticeable medium-sized pores without using any templates. This is because the added anions may form salts (e.g., sodium carbonate, sodium nitrate) that are embedded in the catalysts, and pores are formed when the embedded salts am degraded by calcination. For example, when the calcination temperature is 550° C., sodium nitrate will degrade at 380° C., and once sodium nitrate is burned out, the spaces previously occupied by sodium nitrate become pores. With the same calcination temperature, however, sodium carbonate, whose boiling point is 1600° C., will not degrade but remain embedded in the catalyst. Therefore, referring to FIG. 7, when the sodium carbonate in the basic solution used to synthesize catalyst P-2 or P-3 was removed or was replaced with sodium nitrate, the absence of sodium carbonate enhanced the capillary effect of medium-sized pores, as demonstrated by the adsorption isotherms, and when sodium nitrate was used in place of sodium carbonate (as in the case of catalyst P-3), the sodium nitrate content of catalyst P-3 led to the formation of relatively large medium-sized pores, as shown by the relatively prominent type-H2 hysteresis.

Figure 9:
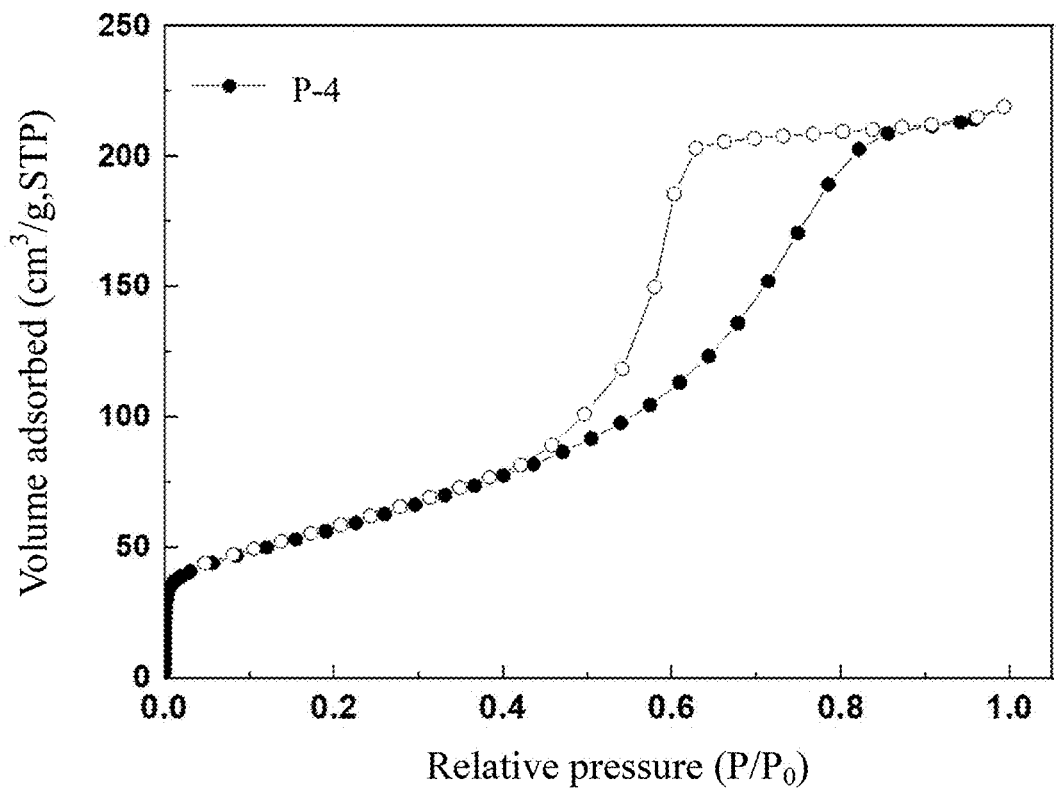
FIG. 9 shows a nitrogen adsorption/desorption isotherm of catalyst P-4 of the invention.
Figure 10:
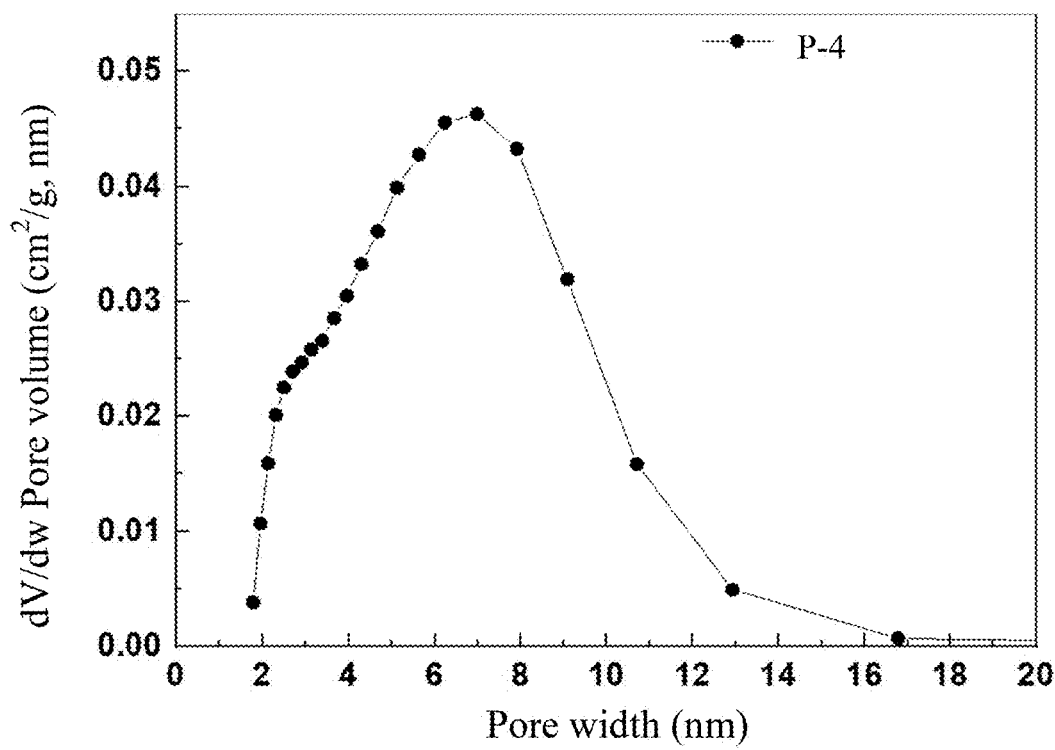
FIG. 10 shows a pore size distribution curve of catalyst P-4 of the invention.
Figure 11:
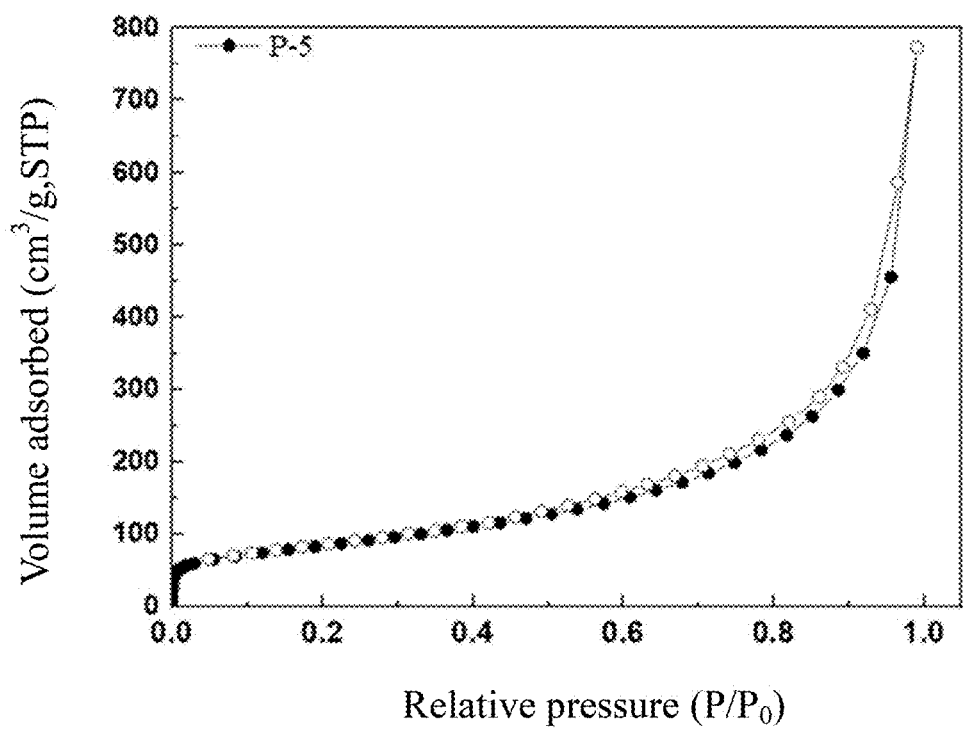
FIG. 11 shows a nitrogen adsorption/desorption isotherm of catalyst P-5 of the invention.
Figure 12:
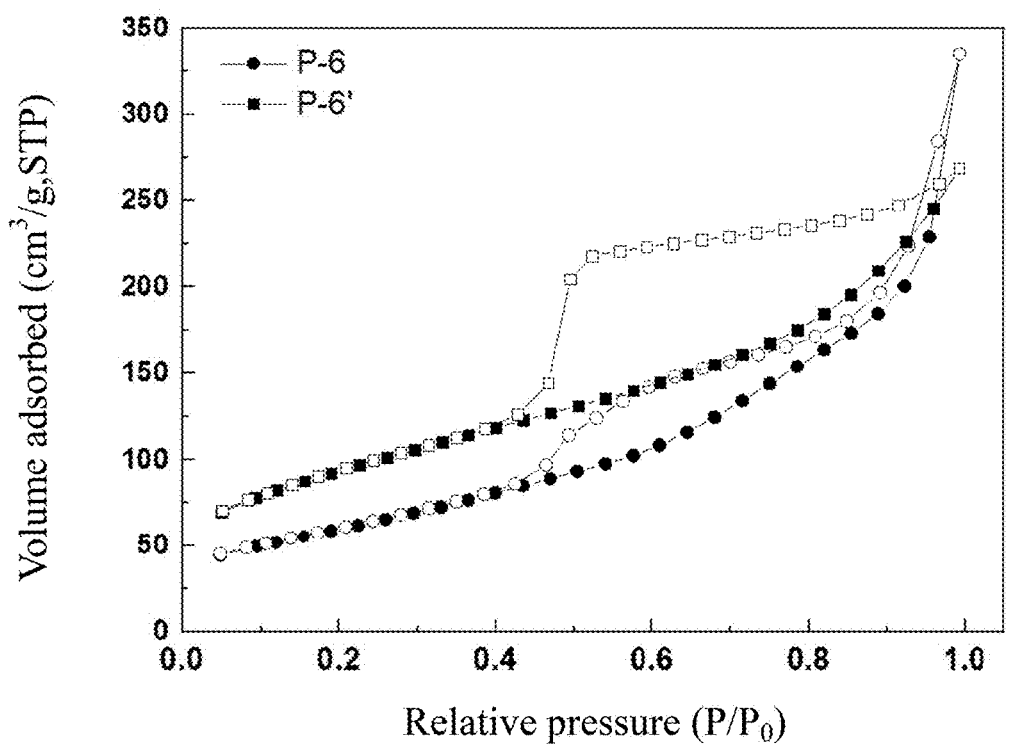
FIG. 12 shows nitrogen adsorption/desorption isotherms of catalysts P-6 and P-6' of the invention.

Referring to FIG. 9 for a nitrogen adsorption and desorption isotherm of catalyst P-4, the adsorption isotherm and the desorption hysteresis curve are also of types IV and H2 respectively (or type IV-H2 collectively), which indicates that catalyst P-4 has medium-sized pores. FIG. 10 shows the pore size distribution of catalyst P-4. The BJH pore sizes are 2.2 nm and 7 nm, and the BET surface area is 208 m$^2$/g. In contrast to catalyst P-4, which was oven-dried before calcination, the freeze-dried catalyst P-5 (whose BET surface area is 301 m$^2$/g) does not have medium-sized pores. Referring to FIG. 11, the nitrogen adsorption isotherm of catalyst P-5 is of type 11, indicating the presence of micropores and the absence of medium-sized pores in catalyst P-5. Meanwhile, the hysteresis curve of catalyst P-5 is of type H3, or the nonporous type. The difference between catalysts P-4 and P-5 is explained as follows. While catalyst P-4 was slowly dried in the oven at 90° C., the water between the colloidal particles was gradually removed such that the particles were brought closer to one another. As the Na$^+$ and NO$_3^-$ ions that were not precipitated during the synthesis process were precipitated during the dehydration process and produced sodium nitrate, the colloidal particles surrounded and were stacked on sodium nitrate. When sodium nitrate was subsequently removed by calcination, therefore, medium-sized pores were formed. In the case of catalyst P-5, however, the water between the colloidal particles was rapidly removed by freeze-drying and formed an aerogel, so the colloidal particles were not stacked around sodium nitrate but formed separate microparticles; consequently, medium-sized pores were not formed. Referring to FIG. 12, the adsorption and desorption isotherm of catalyst P-4, which was synthesized using the alternative sulfate-based metal precursor and whose BET surface area is 218 m$^2$/g, is of type II-H3, which indicates an adsorption and desorption mode of the nonporous type. As the sulfate-based precursor produced sodium sulfate, which will not degrade unless the temperature reaches 1429° C., the calcination process was unable to remove the sodium sulfate produced. Catalyst P-6', which was produced by washing the calcinated catalyst P-6 with deionized water to remove the sodium salt, and whose BET surface area is 332 m$^2$/g, has an unambiguously type-H2 hysteresis curve.

Figure 13:
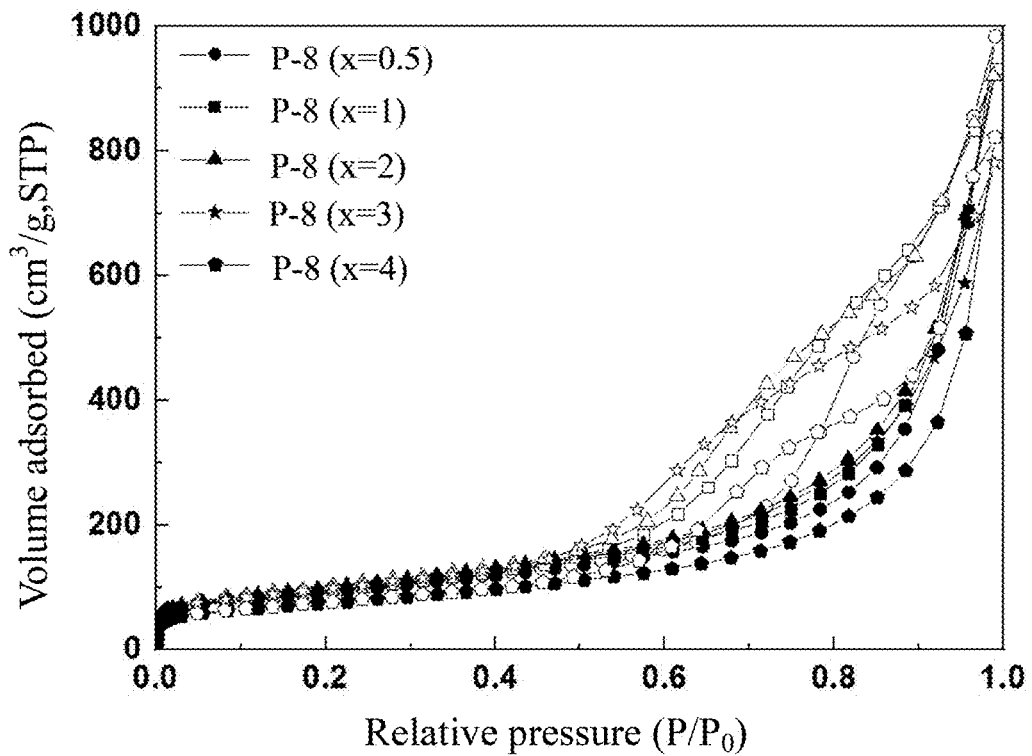
FIG. 13 shows nitrogen adsorption/desorption isotherms of catalysts P-8 of the invention.
Figure 14:
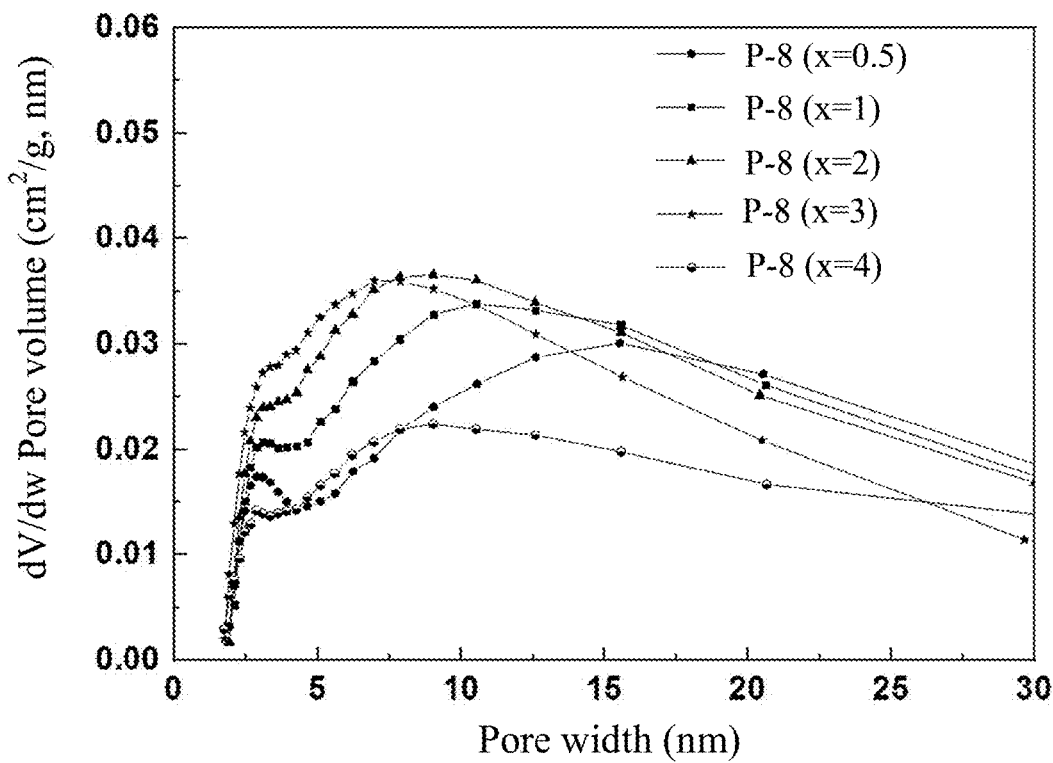
FIG. 14 shows pore size distribution curves of catalysts P-8 of the invention.

Referring to FIG. 13, the nitrogen adsorption and desorption isotherms of catalysts P-8 are of type II-H3. The pore size distributions and specific surface areas of catalysts P-8 are shown in FIG. 14 and Table 2. As shown in FIG. 14, the pore sizes fall mainly within the range of 7~15 nm.

TABLE 2

| Catalysts P-8 | BET surface area (m$^2$/g) | BJH pore size (nm) |
| --- | --- | --- |
| x = 0.5 | 324 | 2.8, 15 |
| x = 1 | 335 | 2.8, 10 |
| x = 2 | 355 | 2.8, 8 |
| x = 3 | 345 | 2.8, 7 |
| x = 4 | 266 | 2.8, 9 |

Temperature-Programmed Desorption of Carbon Dioxide and Ammonia

The surface acidity/basicity and acid/base content were determined by temperature-programmed desorption. In a carbon dioxide (CO$_2$) temperature-programmed desorption profile, the desorption temperature reflects the strength with which CO$_2$ is bonded to the basic points, and the size of the peak area corresponds to the quantity of the basic points. In an ammonia (NH$_3$) temperature-programmed desorption profile, the desorption temperature reflects the strength with which NH$_3$ is bonded to the acidic points, and the size of the peak area corresponds to the quantity of the acidic points.

To perform temperature-programmed desorption analyses on the catalysts prepared in the preparation examples, the Micromeritics AutoChem II 2920 Automated Catalyst Characterization System (Micromeritics, USA) was used. The operation steps and parameter conditions of the system are briefly stated as follows.

A catalyst weight 0.1 g is placed into a U-shaped quartz tube, to which helium is supplied at 30 ml/min. The temperature of the catalyst is then increased at 10° C./min from room temperature to 450° C. and kept at 450° C. for 20 minutes to remove the impurities and moisture inside, and attached to the surface of, the catalyst. The temperature is then lowered from 450° C. to 50° C. and kept at 50° C. for 10 minutes.

A reactant gas (CO$_2$ or NH$_3$) is subsequently supplied for 1 hour in order to be adsorbed by the catalyst. Then, helium is supplied again to desorb the physically adsorbed gas. Once the thermal conductivity detector (TCD) signal, which corresponds to the amount (or volume) of the desorbed gas, becomes stable, the temperature of the catalyst is increased at 10° C./min from 50° C. to 450° C., and the TCD signal is recorded at the same time.

Figure 15:
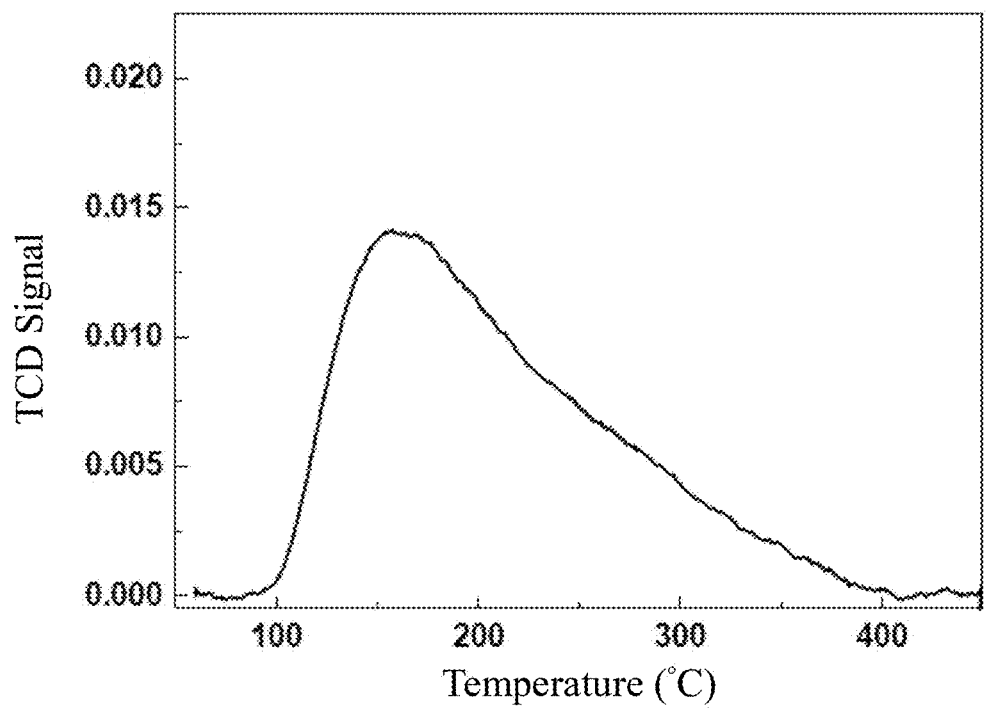
FIG. 15 shows an $NH_3$ temperature-programmed desorption profile of catalyst P-4 of the invention.
Figure 16:
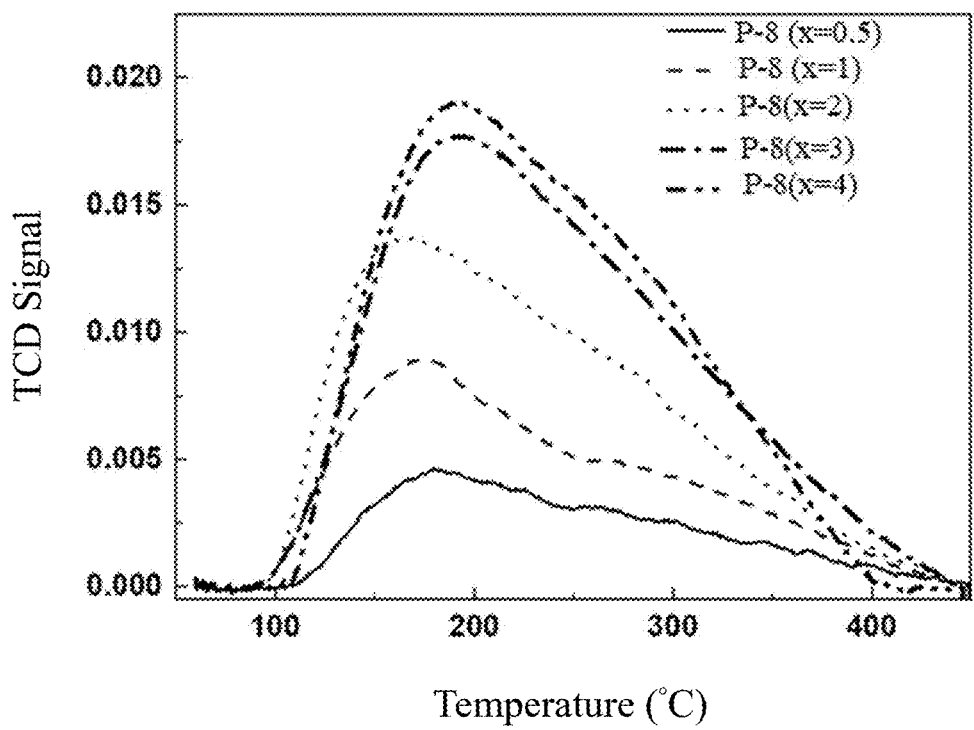
FIG. 16 shows NH % temperature-programmed desorption profiles of catalysts P-8 of the invention.

FIG. 15 shows an NH temperature-programmed desorption profile of catalyst P-4 and FIG. 16 shows those of catalysts P-8. In each catalyst P-8, the acidic points originate from not only the Lewis acid of the central metal, but also the weakly acidic hydroxyl groups on the silica surface; therefore, the acid content increases with the silicon content (see Table 3 below). As for catalyst P-4, its silicon content, and hence acid content, lie between those of catalyst P-8 with x=1 and catalyst P-8 with x=2 (see also Table 3), and the acidity of catalyst P-4 is weak.

Figure 17:
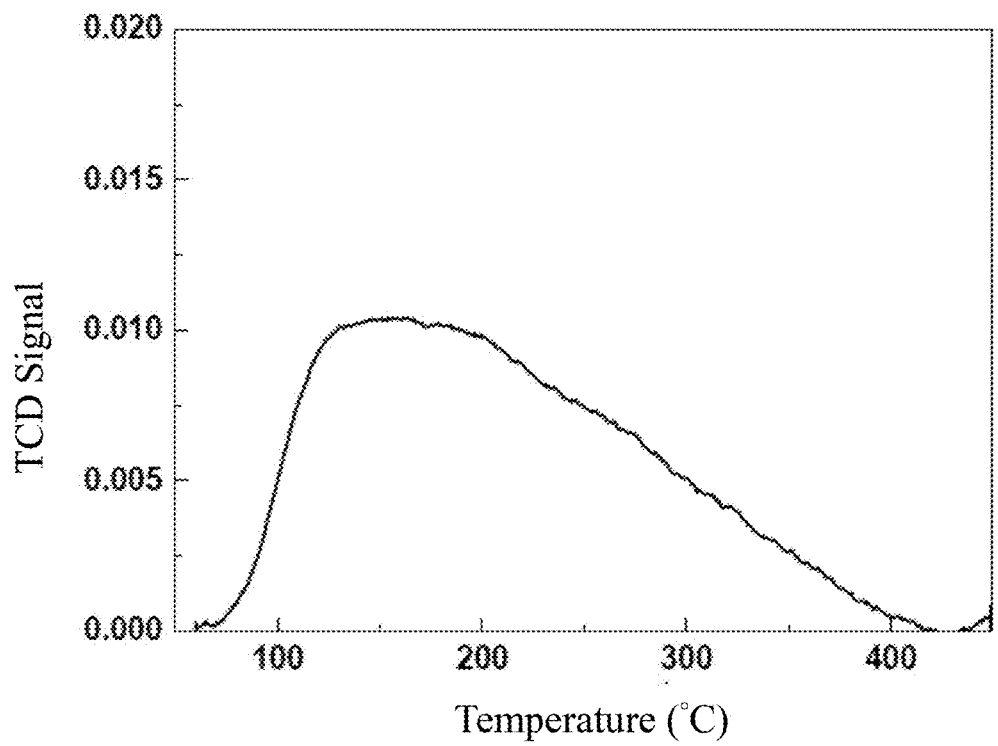
FIG. 17 shows a $CO_2$ temperature-programmed desorption profile of catalyst P-4 of the invention.
Figure 18:
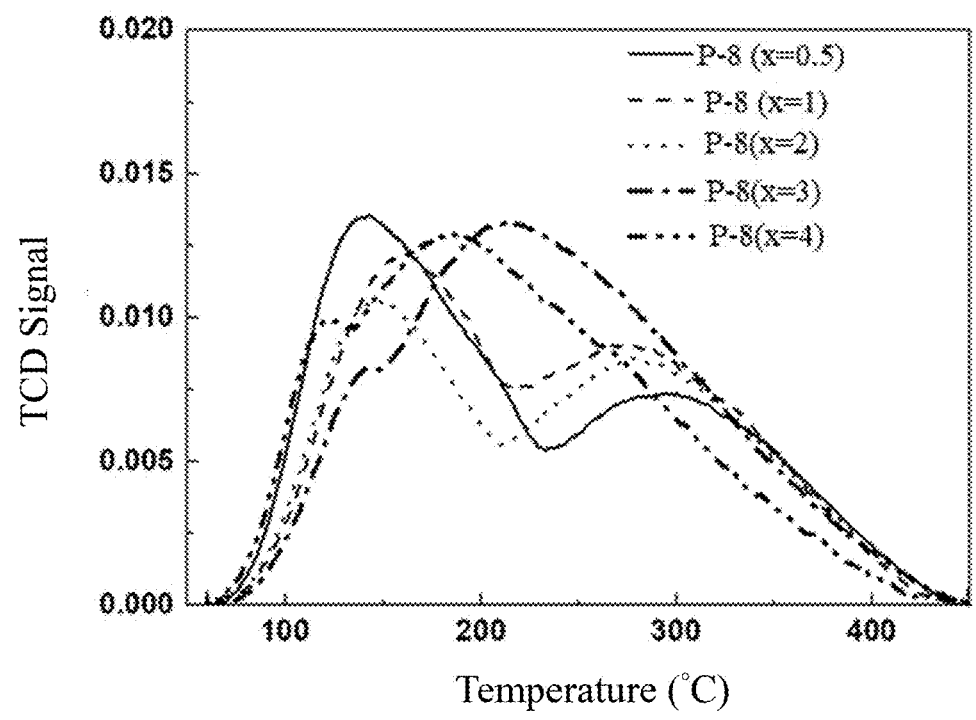
FIG. 18 shows $CO_2$ temperature-programmed desorption profiles of catalysts P-8 of the invention.

FIG. 17 shows a CO$_2$ temperature-programmed desorption profile of catalyst P-4, and FIG. 18 shows those of catalysts P-8. For catalysts P-8, the lowest silicon content produces two peak desorption temperatures, which correspond to a high basicity and a low basicity respectively. As the silicon content increases, basicity moves toward medium and high, peak desorption temperature(s) lowers(lower), and the base content is reduced. Catalyst P-4 has weaker and fewer basic points than catalysts P-8, as shown in Table 3.

TABLE 3

| Catalysts P-8 | Total basic group content (mmol/g) | Total acidic group content (mmol/g) |
|---|---|---|
| x = 0.5 | 0.558 | 0.201 |
| x = 1 | 0.531 | 0.429 |
| x = 2 | 0.461 | 0.583 |
| x = 3 | 0.441 | 0.905 |
| x = 4 | 0.424 | 0.975 |
| Catalyst P-4 | 0.411 | 0.542 |

Catalyst Activity Test

A fixed-bed reactor was used to test catalyst reactivity in the following manner. A reactant was fed at an injection rate of 0.1 ml/hr and was kept at 140° C. to ensure total gasification. The gasified reactant was carried into the reactor by a carrier gas (nitrogen) at a flow rate of 20 ml/min while the catalyst under test was sandwiched between the quartz fiber layers at the center of the reactor.

In this activity test, each catalyst under test weighed 0.1 g and was reacted at a weight hourly space velocity (WHSV) of 0.79 $hr^{-1}$. Temperature was set via a proportional-integral-derivative (PID) controller and was monitored by a thermocouple sensor in the reactor. Before reaction, each catalyst sample under test received a 450° C. heat treatment in nitrogen to remove the $CO_2$ and $H_2O$ adsorbed on the catalyst surface. After the pretreatment, reaction took place at a constant temperature of 250° C. The gaseous product was analyzed by continuous gas chromatography (GC). Test data was collected 1, 1.5, and 2 hours after a stable reactant feed was achieved, and the data collected at the aforesaid time points was averaged as the test result.

[Test of Reaction with Ethanol]

Catalyst samples were reacted with ethanol at 250° C. in order to analyze the distribution of reaction products, wherein the ethanol had a purity of 99.5%, a weight hourly space velocity of 0.79 $hr^{-1}$, and a feed concentration of 2% so as to keep the ethanal conversion rates of all the catalyst samples at 10%~15%. The levels of carbon balance in all the reactions were higher than 95%. Catalyst surface features were observed under the initial conversion conditions.

Figure 19:
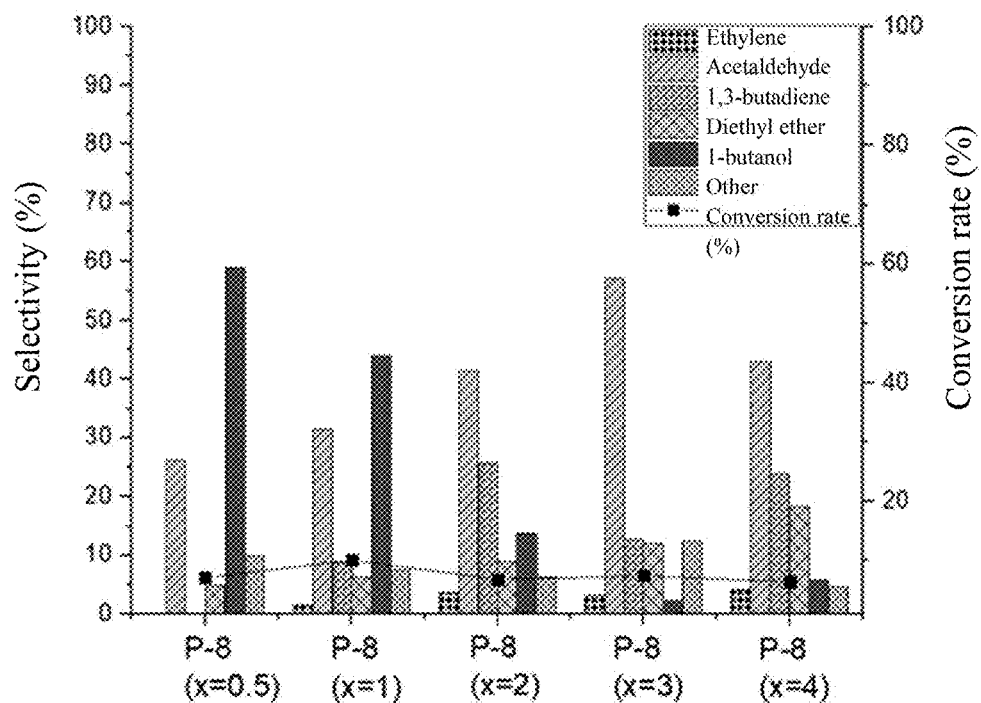
FIG. 19 shows four-carbon product selectivities and ethanol conversion rates of catalysts P-8 (x=0.5~4) of the invention.

FIG. 19 shows the four-carbon product selectivities and ethanol conversion rates of catalysts P-8 (x=0.5~4). The highest four-carbon product selectivity reached 60%. The ethanol conversion rates ranged from about 6% to 11%. When x=2 and above, the main four-carbon product was acetaldehyde, and the reactions tended toward dehydrogenation.

Adsorption and Desorption of Carbon Dioxide

Physical adsorption and desorption of carbon dioxide were measured at 0° C. and 25° C., with a relative pressure $P/P_0$ ranging from 0.0003 to 0.03, where $P_0$ was 26,142 mmHg or 48,273 mmHg. Carbon dioxide is adsorbed to micropores only and therefore can be used to identify micropores.

Figure 20:
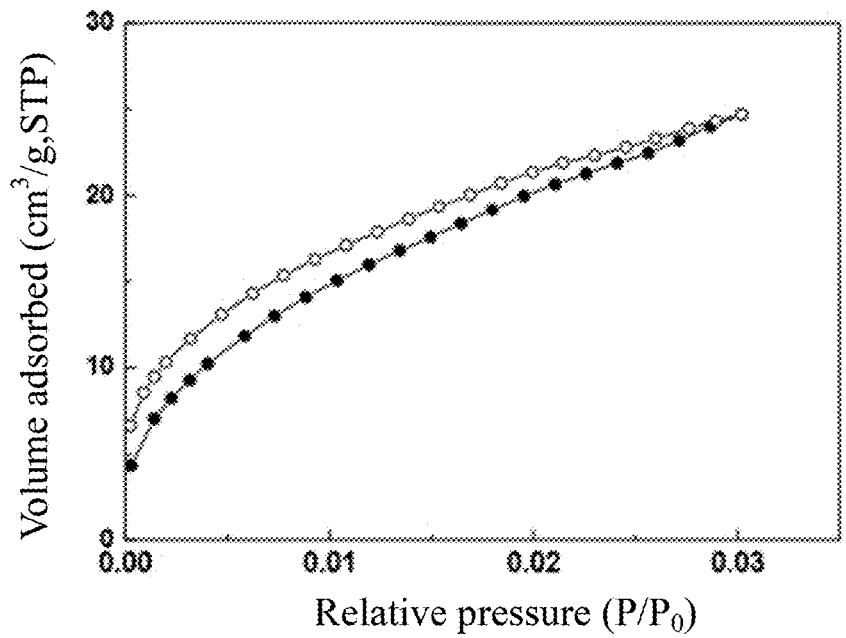
FIG. 20 shows $CO_2$ adsorption/desorption isotherm at 0° C. of catalyst P-4 of the invention.
Figure 21:
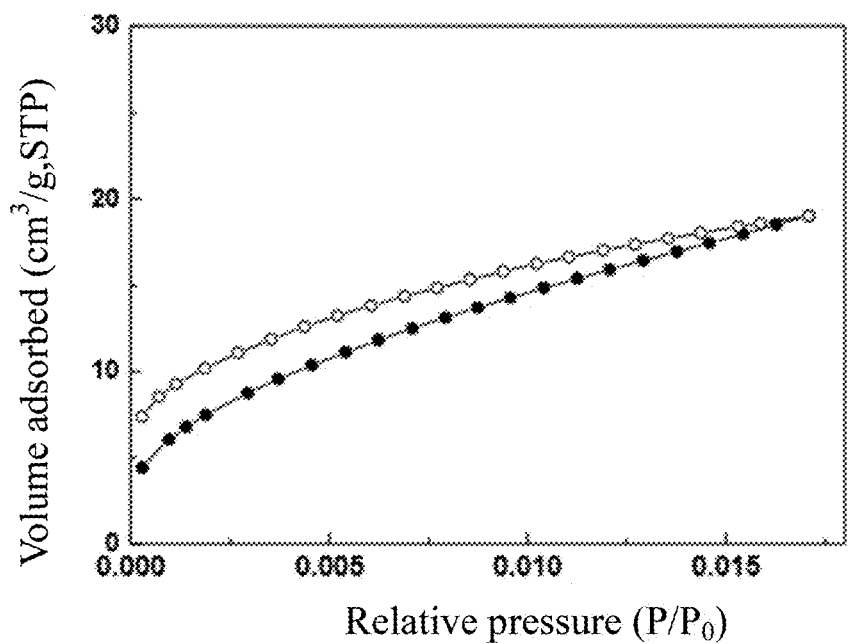
FIG. 21 shows $CO_2$ adsorption/desorption isotherm at 25° C. of catalyst P-4 of the invention.
Figure 22:
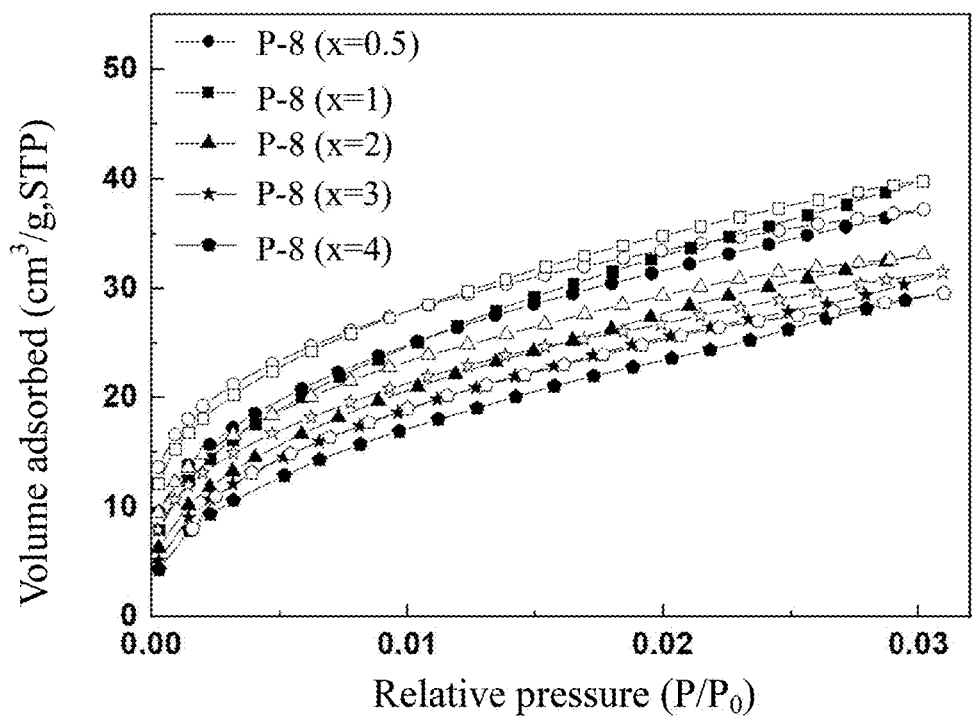
FIG. 22 shows $CO_2$ adsorption/desorption isotherms at 0° C. of catalysts P-8 of the invention.
Figure 23:
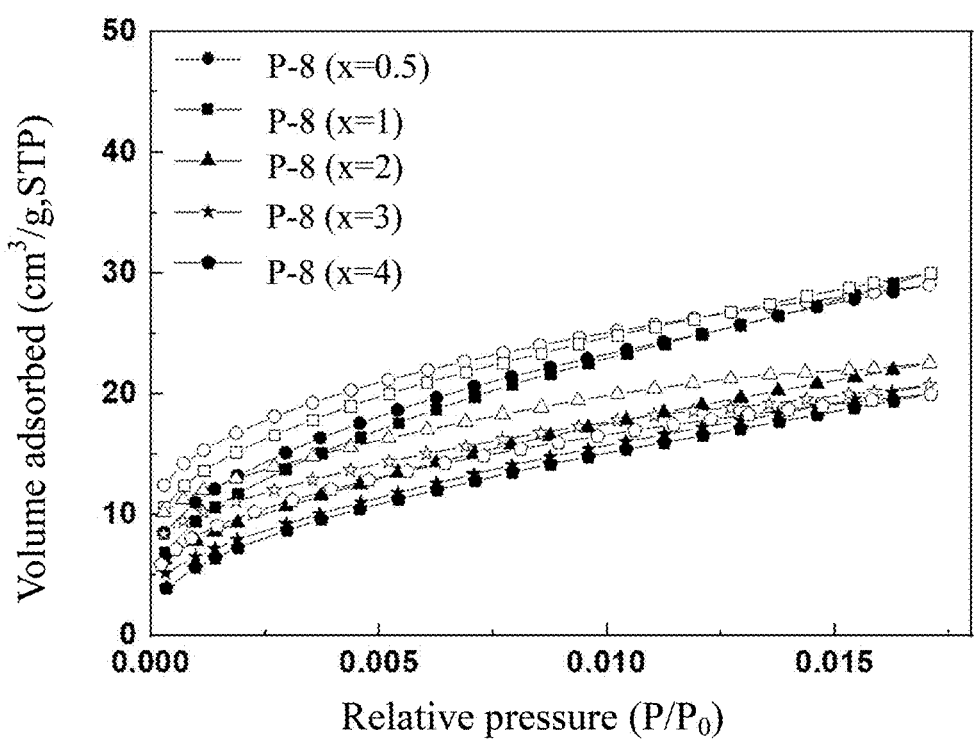
FIG. 23 shows CO adsorption/desorption isotherms at 25° C. of catalysts P-8 of the invention.

Referring to FIG. 20 and FIG. 21 for carbon dioxide adsorption and desorption isotherms of catalyst P-4 at 0° C. and 25° C. respectively, both adsorption isotherms are of the Langmuir adsorption mode, indicating that carbon dioxide was adsorbed in micropores. Moreover, the volumes adsorbed did not change much when temperature rose. Referring to FIG. 22 and FIG. 23 for carbon dioxide adsorption and desorption isotherms of catalysts P-8 at 0° C. and 25° C. respectively, both groups of adsorption isotherms am also of the Langmuir adsorption mode, indicating that carbon dioxide was adsorbed in micropores. In addition, the volumes adsorbed had the same trend as the micropore surface areas (see Table 4 below). This is because when the silicon content increased, the quantity of micropores decreased, and the volumes of adsorbed carbon dioxide were reduced as a result. Besides, the volumes adsorbed were smaller at 25° C. than at 0° C.

TABLE 4

| Catalysts P-8 | t-Plot micropore surface area ($m^2/g$) |
|---|---|
| x = 0.5 | 32.2 |
| x = 1 | 24.8 |
| x = 2 | 19.4 |
| x = 3 | 16.1 |
| x = 4 | 17.5 |

What is claimed is:

1. A method for preparing a metal oxides-silica composite, comprising the steps of:
    providing a silicon-containing basic solution, wherein the silicon-containing basic solution contains a liquid-phase silicon source and a basic agent, both dissolved in a first solvent;
    titrating the silicon-containing basic solution with a metal precursor solution so that a titration reaction takes place between the metal precursor solution and the silicon-containing basic solution at a pH value greater than 7, wherein the metal precursor solution contains an $M^{3+}$ salt and an $N^{2+}$ salt, both dissolved in a second solvent, the $M^{3+}$ salt and the $N^{2+}$ salt are a trivalent metal salt and a bivalent metal salt respectively, and the titration reaction takes place between the metal precursor solution and the silicon-containing basic solution at an $N^{2+}:M^{3+}:Si$ molar ratio of 3:1:x, in which $0<x\leq 10$;
    allowing an aging reaction to take place after completion of the titration reaction, thereby obtaining a precipitate; and
    calcinating the precipitate to obtain the metal oxides-silica composite, wherein the calcinating comprises two-stage process: performing a first calcination process at a temperature of at least 110° C. for a first predetermined amount of time and then raising the temperature to at least 550° C. at which a second calcination process is performed for a second predetermined amount of time.

2. The method of claim 1, wherein the $M^{3+}$ salt is an aluminum salt, and the $N^{2+}$ salt is a magnesium salt.

3. The method of claim 2, wherein the $M^{3+}$ salt is aluminum nitrate, and the $N^{2+}$ salt is magnesium nitrate.

4. The method of claim 1, wherein the basic agent is an alkali metal hydroxide.

5. The method of claim 1, wherein both the first solvent and the second solvent are water or aqueous alcohol solutions.

6. The method of claim 1, wherein the liquid-phase silicon source is selected from the group consisting of alkoxysilane, silicate, and a combination thereof.

7. The method of claim 1, wherein the titration reaction takes place at a pH value greater than or equal to 10.

8. The method of claim 1, wherein the first predetermined amount of time is at least 6 hours, and the second predetermined amount of time is at least 12 hours.

9. The method of claim 1, wherein the calcinating is performed after the precipitate is dried.

* * * * *